(12) United States Patent
Nedoshivin et al.

(10) Patent No.: US 7,443,650 B2
(45) Date of Patent: Oct. 28, 2008

(54) ELECTRODE AND CURRENT COLLECTOR FOR ELECTROCHEMICAL CAPACITOR HAVING DOUBLE ELECTRIC LAYER AND DOUBLE ELECTRIC LAYER ELECTROCHEMICAL CAPACITOR FORMED THEREWITH

(75) Inventors: Valery Pavlovich Nedoshivin, Solnechnogorsky District (RU); Alexey Borisovich Stepanov, Troitsk (RU); Sergey Vladimirovich Tarasov, Saratov (RU); Igor Nikolaevich Varakin, Troitsk (RU); Sergey Nikolaevich Razumov, Moscow (RU)

(73) Assignee: Universal Supercapacitors LLC, Columbus, OH (US)

( * ) Notice: Subject to any disclaimer, the term of this patent is extended or adjusted under 35 U.S.C. 154(b) by 267 days.

(21) Appl. No.: 11/358,980

(22) Filed: Feb. 22, 2006

(65) Prior Publication Data
US 2006/0291139 A1  Dec. 28, 2006

(30) Foreign Application Priority Data
Jun. 24, 2005  (WO) ............... PCT/RU05/00350

(51) Int. Cl.
   *H01G 9/00*  (2006.01)
(52) U.S. Cl. ..................... 361/502; 361/503
(58) Field of Classification Search ............... 361/502, 361/503
   See application file for complete search history.

(56) References Cited

U.S. PATENT DOCUMENTS

| | | |
|---|---|---|
| 3,601,665 A | 8/1971 | O'Nan et al. |
| 4,438,481 A | 3/1984 | Phillips et al. |
| 4,562,511 A | 12/1985 | Nishino et al. |
| 4,697,224 A | 9/1987 | Watanabe |
| 5,045,170 A | 9/1991 | Bullock et al. |

(Continued)

FOREIGN PATENT DOCUMENTS

CA  2137323  6/1995

(Continued)

OTHER PUBLICATIONS

Evans, David A. & Miller, John R., Hybrid Electrolytic/Electrochemical Capacitor for Electric Vehicles, Proceedings—Electrochemical Society, 1997, pp. 253-257, vol. 96-25.

(Continued)

*Primary Examiner*—Eric Thomas
(74) *Attorney, Agent, or Firm*—Standley Law Group LLP

(57) ABSTRACT

An electrode and a DEL capacitor formed therewith. The electrode will typically be a polarizable electrode, and may be formed of an activated carbon material having a substantially zero ash percentage and a low percentage of transition metals. In constructing a DEL capacitor employing such an electrode, a non-polarizable electrode formed from a lead dioxide/lead sulfate compound is preferably also used. The DEL capacitor may utilize an acid-based electrolyte, such as an aqueous sulfuric acid electrolyte. Consequently, the present invention also includes a current collector that preferably comprises a base material formed from a lead or a lead compound and a protective coating material that is resistant to an acid-based electrolyte. Preferably, the protective coating material is formed from a polymer base and a conductive dope that may thereafter be applied to the current collector base material by a variety of methods.

28 Claims, 5 Drawing Sheets

U.S. PATENT DOCUMENTS

| | | |
|---|---|---|
| 5,065,286 A | 11/1991 | Kurabayashi et al. |
| 5,072,335 A | 12/1991 | Kurabayashi et al. |
| 5,072,336 A | 12/1991 | Kurabayashi et al. |
| 5,072,337 A | 12/1991 | Kurabayashi et al. |
| 5,080,963 A | 1/1992 | Tatarchuk et al. |
| 5,099,398 A | 3/1992 | Kurabayashi et al. |
| 5,102,745 A | 4/1992 | Tatarchuk et al. |
| 5,121,301 A | 6/1992 | Kurabayashi et al. |
| 5,142,451 A | 8/1992 | Kurabayashi et al. |
| 5,187,033 A | 2/1993 | Koshiba |
| 5,262,254 A | 11/1993 | Koksbang et al. |
| 5,304,330 A | 4/1994 | Tatarchuk et al. |
| 5,369,547 A | 11/1994 | Evans |
| 5,392,191 A | 2/1995 | Thomas et al. |
| 5,429,893 A | 7/1995 | Thomas |
| 5,441,830 A | 8/1995 | Moulton et al. |
| 5,464,453 A | 11/1995 | Tong et al. |
| 5,464,706 A | 11/1995 | Dasgupta et al. |
| 5,464,707 A | 11/1995 | Moulton et al. |
| 5,478,676 A | 12/1995 | Turi et al. |
| 5,518,839 A | 5/1996 | Olsen |
| 5,527,640 A | 6/1996 | Rudge et al. |
| 5,547,782 A | 8/1996 | Dasgupta et al. |
| 5,568,353 A | 10/1996 | Bai et al. |
| 5,578,396 A | 11/1996 | Fauteux et al. |
| 5,578,399 A | 11/1996 | Olsen |
| 5,580,686 A | 12/1996 | Shi et al. |
| 5,600,535 A | 2/1997 | Jow et al. |
| 5,604,660 A | 2/1997 | Bai et al. |
| 5,621,607 A | 4/1997 | Farahmandi et al. |
| 5,714,053 A | 2/1998 | Howard |
| 5,729,427 A | 3/1998 | Li et al. |
| 5,777,428 A | 7/1998 | Farahmandi et al. |
| 5,824,436 A | 10/1998 | Lian et al. |
| 5,955,215 A | 9/1999 | Kurzweil et al. |
| 5,986,876 A | 11/1999 | Stepanov et al. |
| 6,031,711 A | 2/2000 | Tennent et al. |
| 6,031,712 A | 2/2000 | Kurihara et al. |
| 6,059,847 A | 5/2000 | Farahmandi et al. |
| 6,063,143 A | 5/2000 | Stepanov et al. |
| 6,064,561 A | 5/2000 | Harada et al. |
| 6,088,217 A | 7/2000 | Patel et al. |
| 6,152,970 A * | 11/2000 | Wei et al. .................. 29/25.03 |
| 6,181,545 B1 | 1/2001 | Amatucci et al. |
| 6,181,546 B1 | 1/2001 | Stepanov et al. |
| 6,187,061 B1 | 2/2001 | Amatucci et al. |
| 6,195,252 B1 | 2/2001 | Belyakov et al. |
| 6,201,685 B1 | 3/2001 | Jerabek et al. |
| 6,205,016 B1 | 3/2001 | Niu |
| 6,222,723 B1 | 4/2001 | Razoumov et al. |
| 6,335,857 B1 | 1/2002 | Takimoto et al. |
| 6,335,858 B1 | 1/2002 | Vasechkin et al. |
| 6,339,529 B1 | 1/2002 | Kasahara et al. |
| 6,341,057 B1 | 1/2002 | Nissen et al. |
| 6,343,003 B1 | 1/2002 | Sakata et al. |
| 6,349,027 B1 | 2/2002 | Suhara et al. |
| 6,350,520 B1 | 2/2002 | Nesbitt et al. |
| 6,353,528 B1 | 3/2002 | Hori et al. |
| 6,356,432 B1 | 3/2002 | Danel et al. |
| 6,356,433 B1 | 3/2002 | Shi et al. |
| 6,379,402 B1 | 4/2002 | Suhara et al. |
| 6,383,427 B2 | 5/2002 | Ishikawa et al. |
| 6,383,640 B1 | 5/2002 | Shi et al. |
| 6,402,792 B1 | 6/2002 | Hiratsuka et al. |
| 6,414,836 B1 | 7/2002 | Tennent et al. |
| 6,426,862 B1 | 7/2002 | Vasechkin et al. |
| 6,430,031 B1 | 8/2002 | Dispennette et al. |
| 6,449,139 B1 | 9/2002 | Farahmandi et al. |
| 6,454,815 B1 | 9/2002 | Finello et al. |
| 6,466,429 B1 | 10/2002 | Volfkovich et al. |
| 6,491,789 B2 | 12/2002 | Niu |
| 6,493,210 B2 | 12/2002 | Nonaka et al. |
| 6,503,432 B1 | 1/2003 | Barton et al. |
| 6,510,043 B1 | 1/2003 | Shiue et al. |
| 6,512,667 B2 | 1/2003 | Shiue et al. |
| 6,515,845 B1 | 2/2003 | Oh et al. |
| 6,522,522 B2 | 2/2003 | Yu et al. |
| 6,563,694 B2 | 5/2003 | Kim et al. |
| 6,574,092 B2 | 6/2003 | Sato et al. |
| 6,576,365 B1 | 6/2003 | Meitav et al. |
| 6,602,742 B2 | 8/2003 | Maletin et al. |
| 6,614,646 B2 | 9/2003 | Bogaki et al. |
| 6,628,504 B2 | 9/2003 | Volfkovich et al. |
| 6,631,074 B2 | 10/2003 | Bendale et al. |
| 6,702,963 B2 | 3/2004 | Kibi et al. |
| 6,706,079 B1 | 3/2004 | Shmatko et al. |
| 6,762,926 B1 | 7/2004 | Shiue et al. |
| 6,773,468 B2 | 8/2004 | Lang |
| 6,830,595 B2 | 12/2004 | Reynolds |
| 6,855,273 B2 | 2/2005 | Ravet et al. |
| 6,876,539 B2 | 4/2005 | Michel et al. |
| 6,924,063 B2 | 8/2005 | Che et al. |
| 6,937,460 B2 | 8/2005 | Lang |
| 6,940,706 B2 | 9/2005 | Sakata et al. |
| 6,962,666 B2 | 11/2005 | Ravet et al. |
| 6,967,183 B2 | 11/2005 | Hampden-Smith et al. |
| 7,006,346 B2 | 2/2006 | Volfkovich et al. |
| 2002/0048144 A1 | 4/2002 | Sugo et al. |
| 2002/0114126 A1 | 8/2002 | Hirahara et al. |
| 2002/0122980 A1 | 9/2002 | Fleischer et al. |
| 2002/0122985 A1 | 9/2002 | Sato et al. |
| 2002/0136946 A1 | 9/2002 | Amatucci et al. |
| 2003/0031926 A1 | 2/2003 | Farmer et al. |
| 2003/0036001 A1 | 2/2003 | James et al. |
| 2003/0070916 A1 | 4/2003 | Nanno et al. |
| 2003/0118884 A1 | 6/2003 | Hampden-Smith et al. |
| 2004/0120100 A1 | 6/2004 | Reynolds |
| 2004/0131944 A1 | 7/2004 | Visco et al. |
| 2004/0140458 A1 | 7/2004 | Ravet et al. |
| 2004/0141282 A1 | 7/2004 | Hudis |
| 2004/0191617 A1 | 9/2004 | Visco et al. |
| 2004/0197641 A1 | 10/2004 | Visco et al. |
| 2004/0199015 A1 | 10/2004 | Yuyama et al. |
| 2005/0007727 A1 | 1/2005 | Lang |
| 2005/0019656 A1 | 1/2005 | Yoon et al. |
| 2005/0089754 A1 | 4/2005 | Lang |
| 2005/0141170 A1 | 6/2005 | Honda et al. |
| 2005/0271798 A1 | 12/2005 | Zhong et al. |

FOREIGN PATENT DOCUMENTS

| | | |
|---|---|---|
| EP | 0680061 | 11/1995 |
| EP | 0763836 | 3/1997 |
| EP | 1043744 | 10/2000 |
| EP | 1156500 | 11/2001 |
| EP | 1013506 | 6/2002 |
| WO | 96/12313 | 4/1996 |
| WO | 9924996 | 5/1999 |
| WO | 0033336 | 6/2000 |
| WO | 0219357 | 3/2002 |
| WO | 03/098648 | 11/2003 |

OTHER PUBLICATIONS

Varakin, I.N., Klementov, A.D., Litvinenko, S.V., Starodubtsev, N.F., & Stepanov, A.B., Electrochemical Ultracapacitors and Modules of "ESMA" Company, Official Proceedings 11th Int. Power Quality, Nov. 1998, pp. 90-98.

* cited by examiner

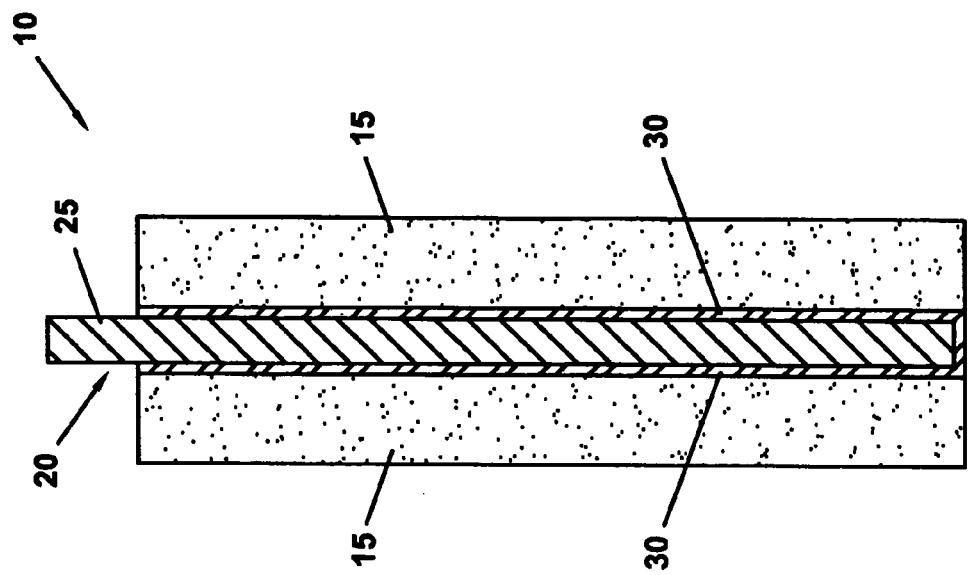
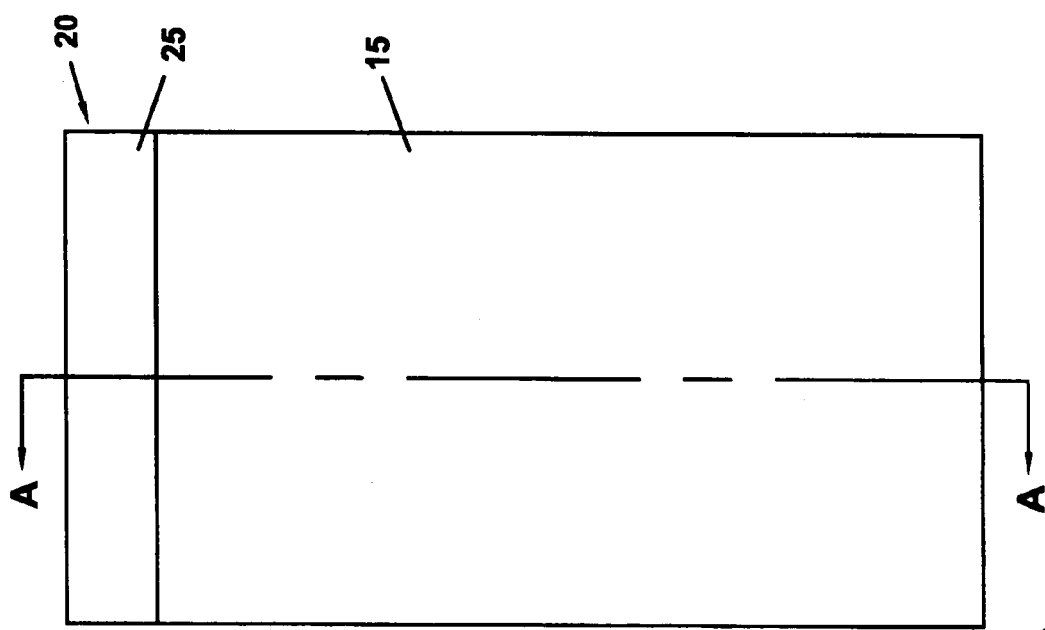

ELECTRODE AND CURRENT COLLECTOR FOR ELECTROCHEMICAL CAPACITOR HAVING DOUBLE ELECTRIC LAYER AND DOUBLE ELECTRIC LAYER ELECTROCHEMICAL CAPACITOR FORMED THEREWITH

This application claims the benefit of PCT Application Ser. No. PCT/RU05/000350, filed on Jun. 24, 2005.

BACKGROUND OF THE INVENTION

The present invention relates to an electrode for use in an electrochemical capacitor. More particularly, the electrode of the present invention is ideal for use in an electrochemical capacitor of high energy storage capacity, wherein the capacitor has a double electric layer. Such capacitors are often referred to as "ultracapacitors" or "supercapacitors," however, they will simply be referred to herein as "capacitors."

There is an increasing focus on the use of capacitors as a means for storing electrical energy. These capacitors can efficiently store and redistribute a large amount of electrical energy. For purposes of illustration, and not limitation, such capacitors may be used: as a main power supply at a particular location; as a back-up power supply at a particular location; for power quality assurance (i.e., to compensate for short-term power "surges", "spikes", and "skips" common to a utility-supplied source of electrical power); to provide load-leveling by storing an amount of electrical energy provided during off-peak hours and thereafter re-distributing said electrical energy during periods of peak demand; and as a primary or secondary power source for a variety of vehicles.

A double electric layer (DEL) capacitor typically comprises a pair of electrodes residing in a spaced apart relationship, between which is an electrolyte. The electrolyte can be either aqueous or non-aqueous in nature, depending on the composition of the electrodes. A separator typically also resides in the space between the electrodes. One or both of the electrodes may store electrical energy through a double layer electrochemical mechanism. In a double electric layer storage process, a layer of electrons forms at the electrode side of the electrode/electrolyte interface. A layer of positive ions also forms on the electrolyte side of the electrode/electrolyte interface. The voltage across the electrode/electrolyte interface increases with charge accumulation, and is eventually released during discharge of the capacitor.

One or both of the electrodes of a DEL capacitor may generally be polarizable electrodes. The polarizable electrode may comprise, for example, an active material and a current collector to which the active material is affixed. The most commonly employed active material is likely one of a plurality of activated carbon materials. Activated carbon materials are inexpensive and have a high specific surface area per unit mass. Electrodes are typically formed from activated carbon materials in the form of an activated carbon powder and a binder, or from woven or non-woven activated carbon fiber materials. However, preparation of DEL electrodes from an activated carbon powder is often preferable due to its lower cost.

As stated above, in a typical capacitor, one or both of the electrodes may be polarizable. However, it has been found that constructing a DEL capacitor with one polarizable electrode and one non-polarizable electrode provides the DEL capacitor with a specific energy capacity that is greater than that of a capacitor with two polarizable electrodes. In such a DEL capacitor, charge storage at the non-polarizable electrode occurs as a result of oxidation and reduction reactions at the interface of the non-polarizable electrode and the electrolyte. Such an electrode is commonly said to exhibit Faradaic pseudocapacitive behavior.

Each of the electrodes of such a DEL capacitor is typically affixed by some means to a current collector. Current collectors are commonly constructed of a material that exhibits electrical conductivity—typically a metal. As at least a portion of the current collector, along with the electrode material, must reside in the electrolyte, it must be ensured that the current collector material will not react adversely thereto. For example, the electrolyte of a DEL capacitor may consist of an aqueous sulfuric acid. In such a case, certain precautions such as, for example, coating or otherwise protecting the portion of the current collector exposed to the electrolyte must generally be undertaken, as the sulfuric acid electrolyte may corrode or erode the current collector material.

While various embodiments of DEL capacitors are currently known, each typically has one or more inherent disadvantages. For example, the activated carbon powders used to form the electrodes of common DEL capacitors are often derived from the processing of coal raw material. Such an activated carbon powder will generally exhibit a high ash percentage (e.g., 15 weight percent or more). Additionally, these activated carbon powders also typically contain an unacceptably high quantity of admixtures of transition metals. This high ash percentage and large quantity of admixtures of transition metals present in the activated carbon powder will, of course, eventually become a part of any electrode formed therefrom. The presence of these impurities in an electrode limits the voltage to which a DEL capacitor employing the electrode can be charged. For example, the presence of admixtures of transition metals can reduce the decomposition voltage of an acid electrolyte and, thereby, decrease the operating voltage of a capacitor.

There are also other disadvantages to known DEL capacitor designs. For example, many of the activated carbon materials employed to form the electrodes of such capacitors require the addition of a large quantity of binder material. The use of more binder material results in a corresponding reduction in the amount of activated carbon material present in the resultant electrode. A reduction in the amount of activated carbon present in the electrode, subsequently diminishes the capacitance and electrical energy storage capabilities of a capacitor to which the electrode is installed. Additionally, steel and similar metals are often used to form the current collectors of a DEL capacitor. Unfortunately, steel and many other metals are not resistant to an acid electrolyte. For example, in the presence of a sulfuric acid electrolyte, a steel current collector will degrade, such as by corrosion. Corrosion of the current collectors can have a negative effect on the cycling capacity and service life of a capacitor. Consequently, to reduce or avoid degradation of such current collectors, known DEL capacitor designs have employed a protective coating that is resistant to the electrolyte used in the capacitor. The protective coating, depending on its composition, can be applied to the current collector by a variety of methods. As one example, a steel current collector may utilize a protective layer of graphite foil. While certain of these coating materials may offer acceptable resistant to the electrolyte in which they reside, there has been a great deal of difficulty in obtaining adequate adhesion between the protective coatings and the subjacent electrode materials. As a result, the electrolyte will often eventually intrude between the protective coating and the current collector. It should be realized that any degradation or erosion of such a metal current collector can adversely effect performance of a DEL capacitor. For example, when a sulfuric acid electrolyte is used, even substantially insignificant quantities of iron present therein can harshly decrease the decomposition voltage of the electrolyte and result in a significant reduction in the operating voltage of the capacitor. Hence, the degradation of the current collector should be avoided.

As can be understood from the foregoing discussion, there are several disadvantages associated with known DEL capacitor designs. The electrode of the present invention utilizes an improved design that substantially reduces or eliminates many of the problems associated with known DEL capacitors. The design of the electrode of the present invention can be used to produce a DEL capacitor having an increased specific energy, better reliability, greater cycling capacity, and an increased service life.

SUMMARY OF THE INVENTION

The present invention includes a novel electrode and a DEL capacitor formed therewith. The electrode of the present invention is contemplated to be a polarizable electrode. The composition of the electrode preferably includes an activated carbon material that has an ash percentage of substantially zero, and that is also substantially free of admixtures of transition metals. Such activated carbon materials are typically obtained from a synthetic base material, such as, for example, by the carbonization and subsequent activation of a furane tar or resin. Other activated carbon materials may also be acceptably used, however, as will be described in more detail below. Preferably, a fluorine-containing binder such as polytetrafluoroethylene (PTFE), or a similar polymer substance, is added to the activated carbon material during production of the electrode material. In constructing a DEL capacitor employing the electrode of the present invention, a non-polarizable electrode is also preferably utilized. In one embodiment of such a DEL capacitor, a non-polarizable electrode composed of lead dioxide/lead sulfate compound is preferably employed.

The present invention further contemplates a DEL capacitor employing an electrode of the present invention. It is expected that such a DEL capacitor may utilize an acid-based electrolyte, such as an aqueous sulfuric acid electrolyte. Consequently, the present invention also includes a current collector for use with the above-described electrode. The current collector of the present invention preferably consists essentially of a base material that will provide for the desired operating voltage window. A number of metallic and non-metallic materials may be successfully employed for this purpose. However, based on its ability to meet various physical requirements while simultaneously being low in cost, lead or a lead compound is especially appealing as a current collector base material. The base material is preferably coated with a protective material that is resistant to an acid-based electrolyte. Preferably, the protective coating material is formed from a polymer base and a conductive dope that may thereafter be applied to the current collector base material by a variety of methods. When such a current collector is manufactured using lead or a lead compound as a base material, the current collector is less expensive and more stable in an acid-based electrolyte than a steel current collector. Further, the protective coating contemplated by the present invention is more reliable than known protective coatings, such as foil coatings that are commonly attached to the current collector base material via an adhesive.

Thus, the electrode of the present invention allows a DEL capacitor formed therewith to overcome many of the disadvantages of known DEL capacitors. Additional details of the electrode and DEL capacitor of the present invention will become apparent upon a reading of the following description and reference to the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1a illustrates a front elevational view of one embodiment of a polarizable electrode assembly of the present invention;

FIG. 1b is a right side, cross-sectional view of the polarizable electrode assembly of FIG. 1a;

FIG. 2b is a right side view of the polarizable electrode of FIG. 2a;

FIG. 3b is a is a right side, cross-sectional view of the current collector of FIG. 3a;

DETAILED DESCRIPTION OF THE EXEMPLARY EMBODIMENT(S)

Figure 2B:
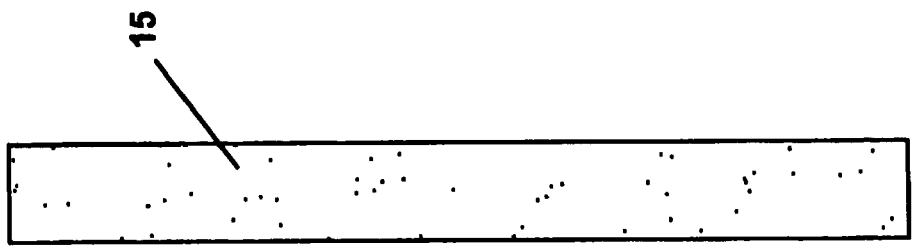
Figure 2A:
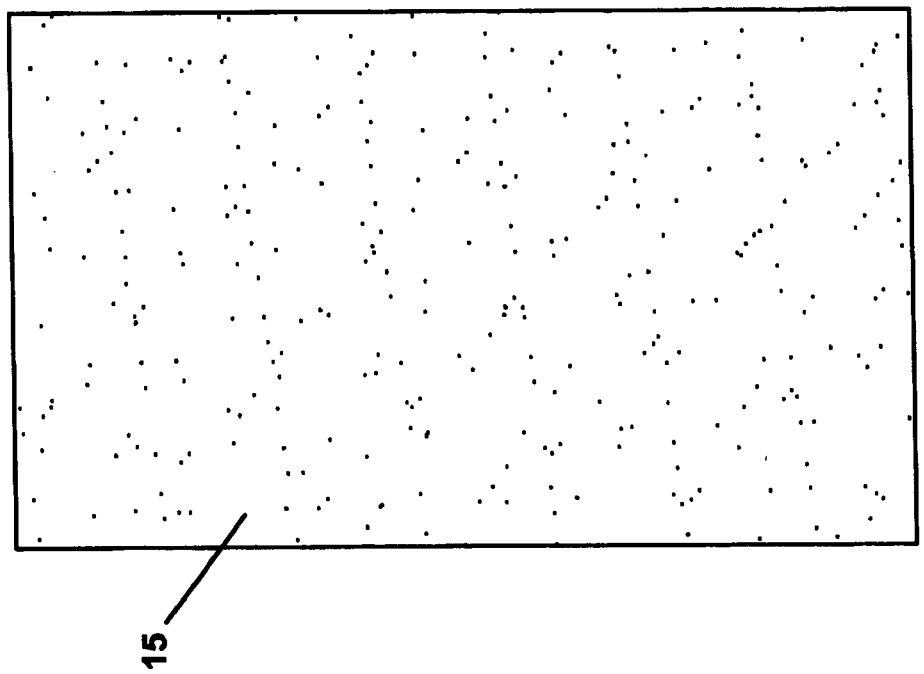
FIG. 2a is a front elevational view of a polarizable electrode portion of the polarizable electrode assembly of FIGS. 1a-1b.
Figure 3B:
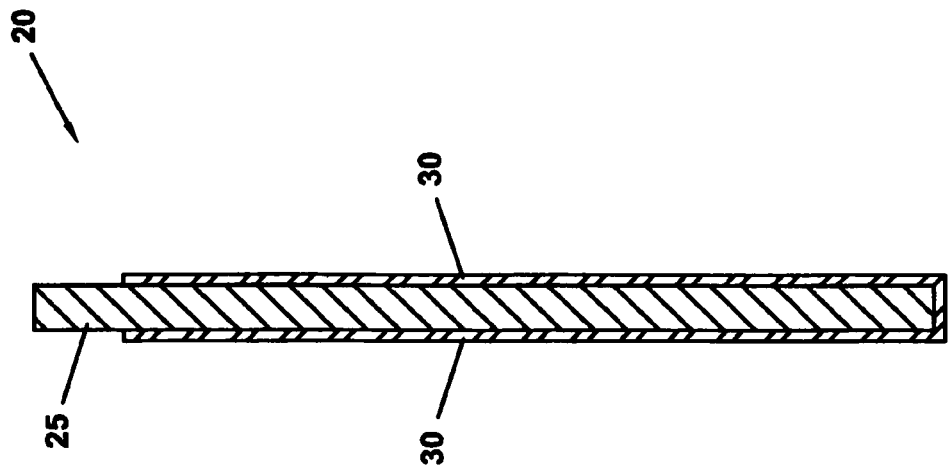
Figure 3A:
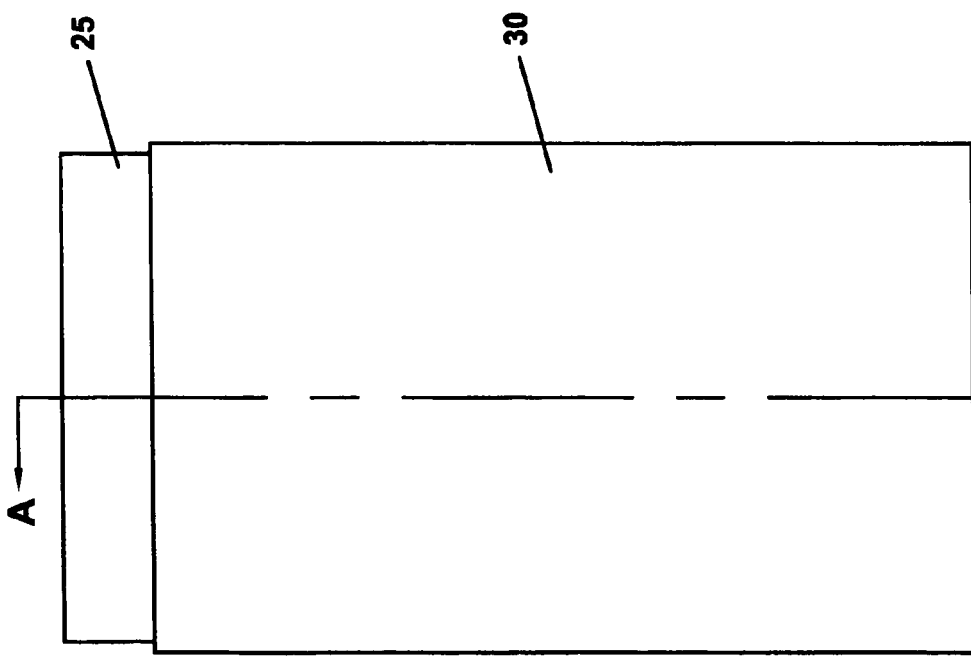
FIG. 3a is a current collector portion of the polarizable electrode assembly of FIGS. 1a-1b.

A detailed view of one embodiment of a polarizable electrode assembly 10 of the present invention can be seen by reference to FIG. 1. The polarizable electrode assembly 10 is formed by sandwiching a current collector 20 having a protective coating 30 between two polarizable electrodes 15. The polarizable electrodes 15 and the current collector 20 can be individually observed in FIGS. 2-3, respectively. It should be noted that certain dimensions, particularly the thickness of the various components of the electrode assembly 10, have been exaggerated in FIGS. 1-5 for purposes of clarity. While it may be possible for an electrode assembly 10 of the present invention to exhibit such a dimensional relationship, it is not intended that an electrode assembly of the present invention be limited to what is shown in FIGS. 1-5.

The material used to form the polarizable electrodes 15 shown in FIGS. 1-2 and 4-5 is an activated carbon material having a very low, or substantially zero, ash percentage. The activated carbon material is preferably also substantially free of admixtures of transition metals. More specifically, it is preferred that the concentration of transition metals in the activated carbon material be less than 500 ppm. Activated carbons produced from various synthetic materials, from carbon black, and from vegetable and mineral materials may be successfully used. Such materials may be subjected to special purification in order to reduce the concentration of transition metals to an acceptable level. An activated carbon material obtained by the proper carbonization and subsequent activation of a furane tar or resin has been determined to be particularly well suited for use in forming a polarizable electrode of the present invention. An acceptable form of such an activated carbon material is available in Russia under the commercial name "FAS." Such an activated carbon material may be in sheet, disk, granule, powder, or other form. Preferably, however, the polarizable electrodes 15 are manufactured using a powdered form of this type of activated carbon material. More preferably, the diameter of the activated carbon particles is no greater than 100 μm, and may be as small as about 100 Å.

To the activated carbon powder material is added a binder. While a number of different binder materials may be used with acceptable results, in one exemplary embodiment of a polarizable electrode of the present invention, the binder includes a fluorine-containing compound, more specifically, a fluorinated polyolefin. One particular binder material that has been found to produce good results is polytetrafluoroethylene (PTFE). In the particular embodiment of the polarizable electrode 15, a binder comprising a fluoroplastic emulsion was mixed with the activated carbon powder. An acceptable version of such a fluorelastic emulsion is available under the commercial name of "F-4D" in Russia. The F-4D fluoroplastic emulsion is an aqueous suspension of fluoroplastic (Teflon) powder. The amount of binder added to the activated carbon material may vary depending on the exact activated carbon material employed. Preferably, however, about 0.5-5.0 weight percent of binder material is used. For example, in forming the particular polarizable electrode 15 shown in FIGS. 1-2 and 4-5, approximately 1.0 weight percent of the fluoroplastic emulsion was mixed into the activated carbon powder.

A polarizable electrode 15 of the present invention can be formed by a variety of known techniques, depending on the desired size and shape thereof. For purposes of illustration, polarizable electrodes of the present invention may be molded, extruded, pressed or rolled into the desired size and/or shape. As one specific example, the polarizable electrodes 15 employed in the exemplary polarizable electrode assembly 10 of FIGS. 1 and 4 were formed by first mixing the activated carbon powder with the fluorine-containing binder material, and subsequently drying the resulting compound to form bricks. The bricks were later wetted with ethyl alcohol and rolled into strips of desired thickness. Electrode cards, or plates, of predetermined length and width were then cut from the strip of the activated carbon/binder compound after it had dried. However, as stated above, a polarizable electrode of the present invention can be of various shape and size. For example, the particular polarizable electrode 15 shown in FIGS. 1-2 and 4-5 has a length (height) of approximately 135 mm, a width of approximately 70 mm, and a thickness of approximately 1.4 mm.

The polarizable electrode assembly 10 of the present invention also employs a current collector 20. In the exemplary embodiment of the polarizable electrode assembly 10 shown in FIGS. 1 and 4-5, the current collector can be seen to include a conductive substrate in the form of a collector plate 25, onto which is applied a protective coating 30. It should be understood, however, that the size and/or shape of the current collector 20 is not limited to that shown, but can vary as necessary to conform to the design of the capacitor to which it will be installed. For example, the conductive substrate can be of other shapes, such as a cylinder. It should also be understood that, for purposes of clarity, the thickness of the current collector components may be exaggerated in the drawing figures. For example, in the particular embodiment of the current collector 20 shown in FIGS. 1 and 3-5, the thickness of the collector plate 25 is actually only about 0.2 mm, and the thickness of the protective coating is actually only about 7 μm.

In the polarizable electrode assembly 10 of the present invention, the collector plate 25 resides between a pair of the polarizable electrodes 15. The collector plate 25 may be comprised of a number of conductive metallic or non-metallic materials. For example, it is contemplated that the collector plate 25 may be manufactured from conductive materials such as lead, tantalum, niobium, silver, copper, bismuth, ruthenium, closely-packed graphites, or nitrides and carbides of various transition metals. However, due to its ability to meet various physical property requirements, and its low cost, it is preferred that the collector plate 25 of the present invention be comprised of lead or a lead compound. For example, in the particular embodiment of the current collector 20 shown in FIGS. 1 and 3-5, the collector plate 25 is formed from a compound consisting essentially of lead and approximately 3 weight percent of tin. Lead is preferable over steel because it is more stable in an acidic electrolyte.

Figure 4:
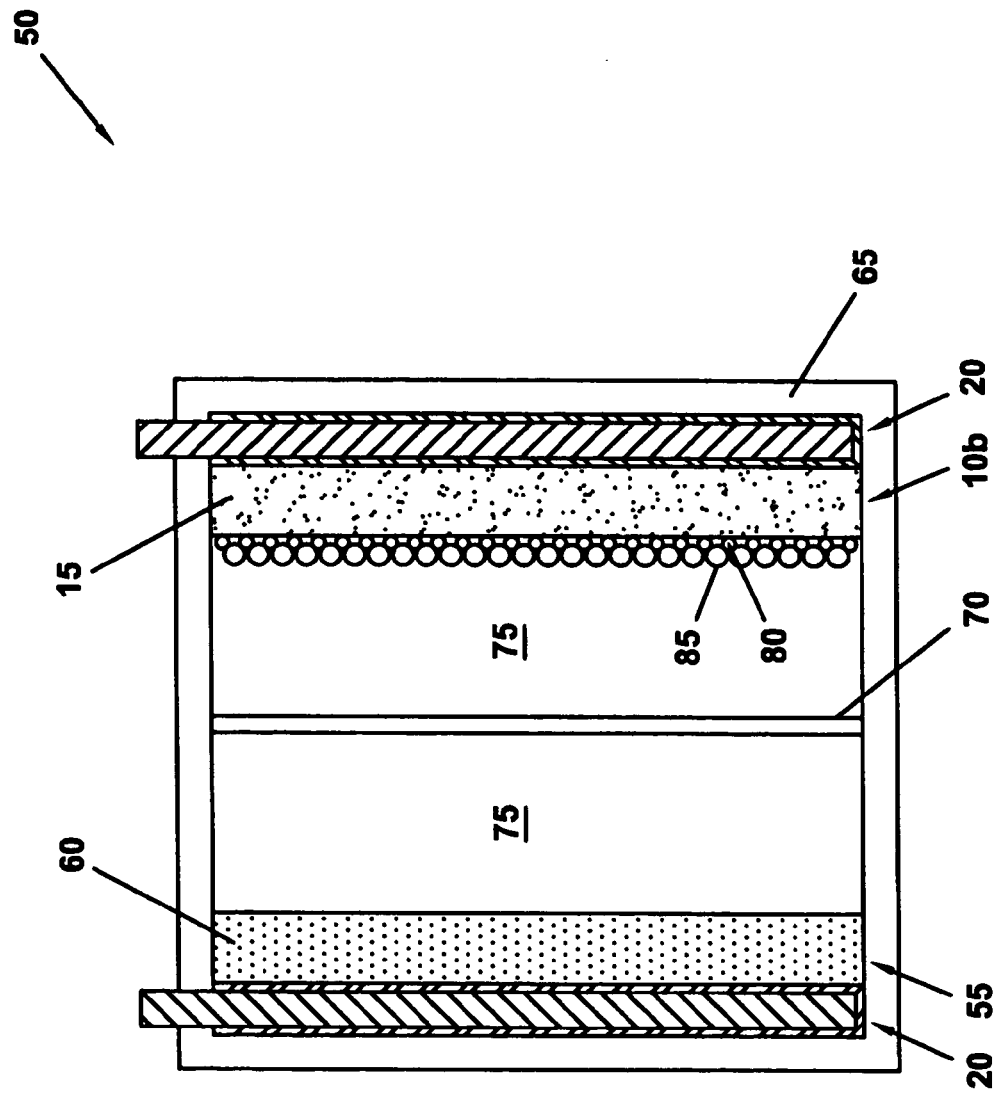
FIG. 4 depicts one embodiment of a DEL capacitor of the present invention.
Figure 5:
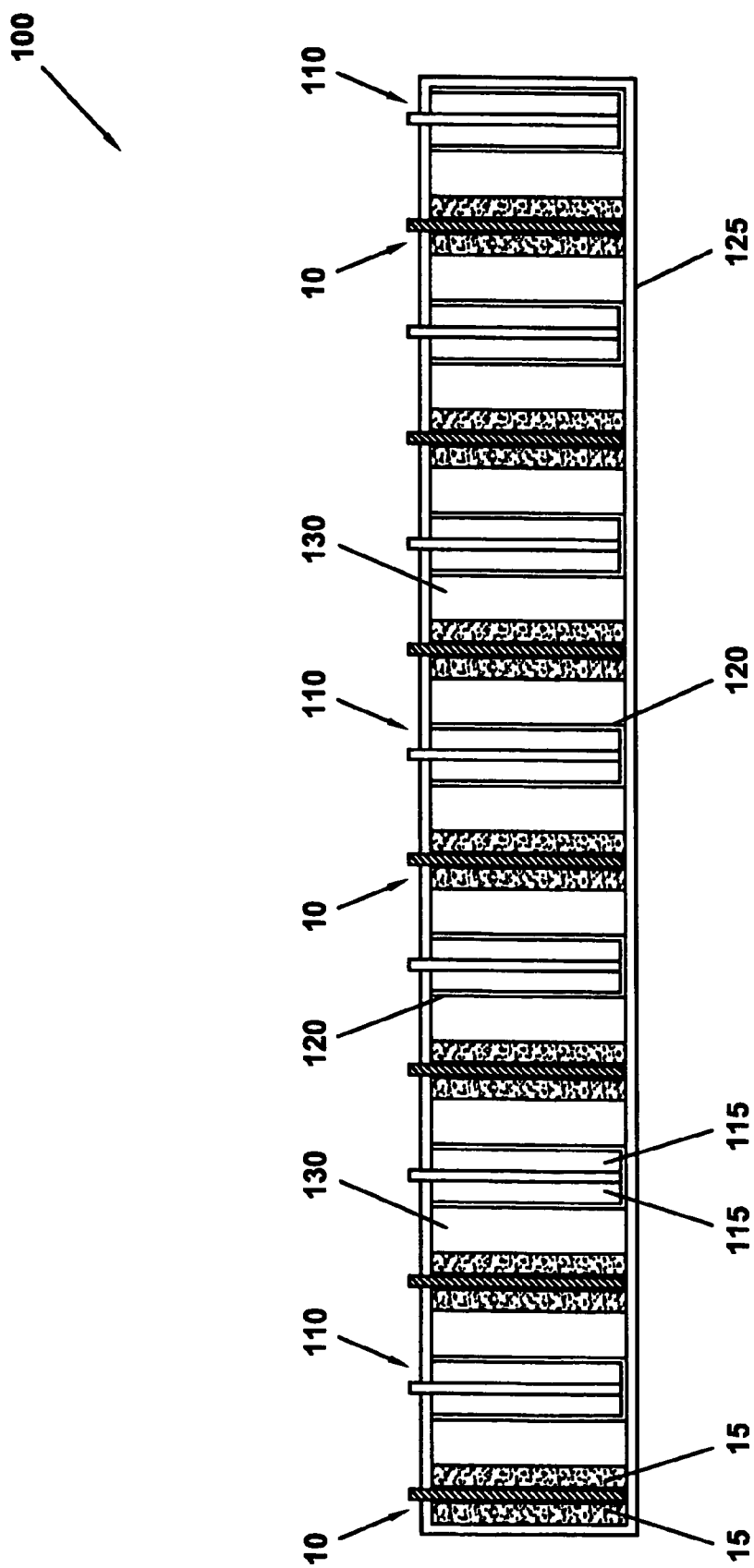
FIG. 5 shows an alternate embodiment of a DEL capacitor of the present invention, wherein a plurality of the polarizable electrode assemblies of FIGS. 1a-1b are employed.

While a lead-based collector plate 25 is more stable than steel in an acidic electrolyte, it is not fully resistant thereto. In fact, over time an acidic electrolyte can corrode or otherwise degrade a lead-based current collector plate, thereby resulting in decreased capacitor performance. Consequently, the lead-based collector plate 25 of the present invention is preferably provided with a protective coating 30. Preferably, the protective coating 30 encases at least that portion of the collector plate 25 that will be exposed to the electrolyte of the capacitor to which it is installed. For example, in the exemplary embodiment of the electrode assembly 10 of the present invention, the protective coating 30 is applied to an area that corresponds substantially to an area of the collector plate 25 that will mate with each polarizable electrode 15. As can be seen in FIGS. 4-5, it is this area of the polarizable electrode assembly 10 that is in substantial contact with the electrolyte of the exemplary DEL capacitor illustrated therein.

The protective coating 30 applied to the collector plate 25 may have various compositions. Preferably, the protective coating 30 consists of a conductive composite that is stable in an acidic electrolyte, such as a sulfuric acid electrolyte. The conductive composite may be formed from a polymer base material and a conductive dope. Non-limiting examples of acceptable polymer base materials include: bitumen; tar; coal-tar pitch; halogenated polymers; polymers based on polyurethane; and organic silicon compounds. Non-limiting examples of acceptable conductive dopes include: carbon black; graphite; and carbon fiber. Preferably, the conductive dope comprises approximately 30-90 weight percent of the protective coating 30. The conductive dope may comprise more or less than 30-90 weight percent of the protective coating 30, but typically with undesirable consequences. For example, it has been found that with less than 30 weight percent of conductive dope, the conductivity of the protective coating 30 may become unsatisfactory. Similarly, it has been found that with greater than 90 weight percent of conductive dope, the level of protection provided by the protective coating 30 may be degraded. In an alternate embodiment of a current collector of the present invention, a protective coating may be prepared by mixing a monomer and oligomer (containing plasticizers and hardeners) with a conductive dope. In this embodiment, the polymer base may then be generated directly on the surface of the collector plate by the polymerization of the monomer and oligomer.

The protective coating 30 may be prepared and applied by a number of known methods. For example, initial preparation may include mixing the polymer base material with the conductive dope, and subsequent creation of a solution by introducing the mixture to a solvent. Application of the protective coating 30 to the collector plate 25 may be accomplished by traditional means. For example, the protective coating 30 may be applied to the collector plate 25 by brushing, rolling, dipping, screen printing, spraying, or other similar means of deposition. If a solvent was introduced to the protective coating material 30 prior to application, the solvent is preferably removed therefrom by drying after the protective coating has been applied. Further, a thermal treatment process may be used to improve adhesion between the protective coating 30 and the collector plate 25, and/or the protective characteristics of the protective coating. A current collector 20 so produced is inexpensive and highly resistant to corrosion when exposed to an acidic electrolyte. In addition, the protective coating 30 of the present invention is more reliable than other known methods of current collector protection, such as, for example, the adhesive bonding of a protective foil to a collector plate. Below, are several non-limiting examples of acceptable protective coating compositions:

EXAMPLE 1

A composite mixture comprising approximately 30 weight percent of a bitumen polymer and approximately 70 weight percent of a carbon black conductive dope was prepared. The composite was prepared in the presence of a heptane solvent to facilitate application to the collector plate. The composite was thereafter applied to the collector plate and subsequently dried at approximately 60° C. to remove the solvent. Thereafter, the composite-coated collector plate was thermally treated at a temperature of between about 120-140° C.

EXAMPLE 2

A composite mixture comprising approximately 30 weight percent of a tar polymer and approximately 70 weight percent of a carbon black conductive dope was prepared. The composite was prepared in the presence of a heptane solvent to facilitate application to the collector plate. The composite was thereafter applied to the collector plate and subsequently dried at approximately 60° C. to remove the solvent. Thereafter, the composite-coated collector plate was thermally treated at a temperature of between about 120-140° C.

EXAMPLE 3

A composite mixture comprising approximately 25 weight percent of a cold-hardening chlorinated polymer and approximately 75 weight percent of a finely dispersed graphite conductive dope was prepared. A suitable cold-hardening chlorinated polymer is available under the trade name of Remochlor. The composite was applied to the collector plate, and the composite-coated collector plate was subsequently thermally treated at a temperature of about 60° C.

EXAMPLE 4

A composite mixture comprising approximately 25 weight percent of an organo-silicon polymer and approximately 75 weight percent of a finely dispersed fiber material conductive dope was prepared. A suitable organo-silicon polymer is available under the trade name of KP-303B from the BASF® company. An acceptable fiber material can be obtained by the graphitization of fossil coal. The composite was applied to the collector plate, and the composite-coated collector plate was subsequently thermally treated at a temperature of about 120° C.-130° C.

EXAMPLE 5

A composite mixture comprising approximately 25 weight percent of a polyurethane varnish-based polymer and approximately 75 weight percent of a finely dispersed fiber material conductive dope was prepared. A suitable polyurethane varnish-based polymer is available under the trade name CRAMOLIN® URETHANE-Clear, and can be obtained from ITW Chemische Produkte GmbH in Germany. An acceptable fiber material can be obtained by the graphitization of fossil coal. The composite was applied to the collector plate, and the composite-coated collector plate was subsequently thermally treated at a temperature of about 90° C.

Once the current collector 20 has been produced by sufficiently applying the protective coating 30 to the collector plate 25, the polarizable electrodes 15 can be affixed thereto. The polarizable electrodes 15 of the present invention can be affixed to the protective coating 30 covered collector plate 25 by a number of means including, for purposes of illustration and not limitation, adhesive bonding and/or pressing/molding. The combination of the current collector 20 and the polarizable electrodes 15 form the exemplary polarizable electrode assembly 10 shown in FIGS. 1 and 4-5. While the exemplary embodiment of the polarizable electrode assembly 10 of FIGS. 1 and 4-5 is shown to have a polarizable electrode 15 on opposite sides of the collector plate 25, it is also possible, depending on the design of the capacitor to which the polarizable electrode assembly will be installed, to locate a polarizable electrode on only one side of the collector plate.

The polarizable electrode assembly 10 is designed for use in an electrochemical capacitor. As the simplest example, such an electrochemical capacitor may have only two electrodes, separated by an electrolyte and possibly a separator. While it is possible to construct such a capacitor using two polarizable electrode assemblies 10, it is preferred that a capacitor of the present invention have both a polarizable electrode assembly and a non-polarizable electrode assembly. Such an arrangement can be observed by specific reference to FIG. 4. FIG. 4 illustrates an exemplary, and simplistic, embodiment of a DEL capacitor 50 of the present invention. As can be seen, a polarizable electrode assembly 10b and a non-polarizable electrode assembly 55 reside on substantially opposite ends of a sealed enclosure 65. The polarizable electrode assembly 10b comprises a previously-described current collector 20 of the present invention, to which is affixed a single polarizable electrode 15. The non-polarizable electrode assembly 55 comprises a previously-described current collector 20 of the present invention, to which is affixed a single non-polarizable electrode 60. While other materials may be used to form a non-polarizable electrode of the present invention, the non-polarizable electrode 60 of the exemplary embodiment shown in FIG. 4 is formed from a mixture of lead dioxide and lead sulfate. The non-polarizable electrode may be formed and affixed to its current collector 20 by any of a multitude of known techniques. The polarizable and non-polarizable electrodes 15, 60 may be of symmetric or asymmetric design. More specifically, the polarizable and non-polarizable electrodes 15, 60 may have a similar or dissimilar absolute capacitance. When a DEL capacitor of the present invention employs an asymmetric design, the absolute capacitance of the larger capacitance electrode is preferably at least 3 times and, more preferably, approximately 10 times the absolute capacitance of the smaller capacitance electrode.

As can be seen in FIG. 4, the current collectors 20 of the polarizable and non-polarizable electrode assemblies 10b, 55 are allowed to protrude through the enclosure 65 for proper electrical connection. The interface between the current collectors 20 and the enclosure 65 may be provided with a seal (not shown). A separator 70 may be located within the enclosure 65 to divide the hollow space between the electrode assemblies 10b, 55. The separator 70 may be formed from various materials. For example, the separator 70 may be formed of one of the variety of materials commonly utilized in the manufacture of separators lead-acid batteries. Whatever specific material is selected for creating the separator 70, it should provide for a high level of oxygen transfer from the positive electrode to the negative electrode (i.e., from the non-polarizable electrode to the polarizable electrode in the embodiment of FIG. 4), and also allow for the realization of an efficient oxygen cycle during charging of the capacitor. In the exemplary embodiment of FIG. 4, the separator 70 is constructed of an ion-permeable glass material. The remaining hollow space within the enclosure 65 is substantially filled with an electrolyte 75. Depending on the composition of the electrodes 15, 60, a number of different electrolytes may be suitably employed in such a capacitor. In the exemplary embodiment of the DEL capacitor 50 shown in FIG. 4, an aqueous sulfuric acid is utilized as the electrolyte 75.

In operation, a voltage is applied to the DEL capacitor 50. As the voltage is applied, oxidation/reduction reactions will occur at the interface of the non-polarizable electrode 60 and the electrolyte 75. These oxidation/reduction reactions are the result of the Faradaic pseudocapacitive behavior of the non-polarizable electrode 60 and are responsible for charge transfer at the non-polarizable electrode. During voltage application, the polarizable electrode 15 will store electrical energy through a double layer electrochemical mechanism (a non-Faradaic process). In this process, a layer of electrons 80 will form at the electrode 15 side of the electrode/electrolyte interface, while a layer of positive ions 85 will form on the electrolyte side of the electrode/electrolyte interface. The voltage across this interface increases with charge accumulation, and is eventually released during discharge of the capacitor.

A multi-celled DEL capacitor 100 of the present invention can be observed in FIG. 5. The multi-celled DEL capacitor 100 utilizes seven of the polarizable electrode assemblies 10 shown in FIG. 1. The multi-celled DEL capacitor 100 also utilizes seven non-polarizable electrode assemblies 110. The seven polarizable electrode assemblies 10 and the seven non-polarizable electrode assemblies 110 are located within an enclosure 125 in a spaced-apart, alternating relationship. Unlike the DEL capacitor 50 of FIG. 4, the polarizable and non-polarizable electrode assemblies 10, 110 of the DEL capacitor 100 of FIG. 5 utilize a current collector 20 that is sandwiched between two electrodes 15, 115. Each of the non-polarizable electrode assemblies 110 is also shown to be substantially encased within a glass separator 120. An aqueous sulfuric acid electrolyte 130 substantially fills the hollow space within the enclosure 125 and between the electrode assemblies 10, 110. The DEL capacitor 100 of the present invention operates in a manner similar to the DEL capacitor of FIG. 4. However, due to the increased number of electrode assemblies 10, 110 used, the overall storage capacity of the DEL capacitor 100 is increased.

The design of the polarizable electrode/electrode assembly allows for the construction of a DEL capacitor having improved energy storage capacity. For example, exemplary DEL test capacitors using a polarizable electrode assembly and lead-based current collector, as described above, have exhibited an operating voltage of up to about 2.2 volts. In addition, these electrodes have exhibited a specific capacitance in the range of approximately 900-1,000 F/g when exposed to a sulfuric acid electrolyte. Therefore, DEL capacitors constructed according to the present invention can possess specific energies of about 18-20 Wh/kg, or approximately 60 Wh/l.

While certain embodiments of the present invention are described in detail above, the scope of the invention is not to be considered limited by such disclosure, and modifications are possible without departing from the spirit of the invention as evidenced by the following claims.

What is claimed is:

1. An electrode assembly for use in an electrochemical capacitor, comprising:
    at least one electrode consisting essentially of a composite mixture having an active material comprising an activated carbon obtained from the carbonization and subsequent activation of a furane tar and/or a furane resin, and a fluorine-containing polymer binder; and
    a current collector, said current collector further comprising:
        a substrate formed from an electrically conductive material, and
        a protective coating encasing at least a portion of said substrate that will be exposed to an electrolyte once said current collector is installed to said electrochemical capacitor, said protective coating consisting essentially of a composite having a polymer base material and a conductive dope,
    wherein said at least one electrode is affixed to said substrate after said substrate is covered with said protective coating; and
    wherein said protective coating is resistant to an acid-based electrolyte.

2. The electrode assembly of claim 1, wherein said at least one electrode is polarizable.

3. The electrode assembly of claim 1, wherein said conductive substrate of said current collector comprises lead or a lead compound.

4. The electrode assembly of claim 3, wherein said conductive substrate of said current collector comprises a mixture of lead and tin.

5. The electrode assembly of claim 1, wherein said polymer base material of said protective coating is selected from the group consisting of bitumen, tar, coal-tar pitch, halogenated polymers, polymers based on polyurethane, and organic silicon polymers.

6. The electrode assembly of claim 1, wherein said conductive dope of said protective coating is selected from the group consisting of carbon black, graphite, and carbon fiber.

7. The electrode assembly of claim 1, further comprising the addition of an organic solvent to said composite protective coating.

8. The electrode assembly of claim 1, wherein said protective coating is applied to said substrate by a method selected from the group consisting of brushing, rolling, dipping, screen printing, and spraying.

9. The electrode assembly of claim 1, wherein said protective coating comprises a mixture of a monomer and an oligomer that contains plasticizers and hardeners, whereby, after application of said protective coating, said polymer base is generated directly on the surface of said substrate by the polymerization of said monomer and said oligomer.

10. The electrode assembly of claim 1, wherein resistant and adhesive properties of said protective coating are enhanced by exposure to a predetermined range of elevated temperatures.

11. The electrode assembly of claim 1, wherein said at least one electrode is affixed to said protective coating covered substrate by means of an adhesive.

12. The electrode assembly of claim 1, wherein said at least one electrode is affixed to said protective coating covered substrate by pressing.

13. The electrode assembly of claim 1, wherein said at least one electrode is affixed to said protective coating covered substrate by both an adhesive and pressing means.

14. The electrode assembly of claim 1, wherein said at least one electrode is molded onto said protective coating covered substrate during forming of said at least one electrode.

15. The electrode assembly of claim 1, wherein said protective coating is resistant to sulfuric acid.

16. A double electric layer electrochemical capacitor, comprising:
- at least one polarizable electrode assembly, said polarizable electrode assembly further comprising:
  - (a) at least one electrode comprising a composite mixture having an active material consisting essentially of an activated carbon obtained from the carbonization and subsequent activation of a furane tar and/or a furane resin, and a fluorine-containing polymer binder; and
  - (b) a current collector, said current collector further comprising: a substrate formed from an electrically conductive material, and a protective coating encasing at least a portion of said substrate that will be exposed to an electrolyte once said current collector is installed to said electrochemical capacitor, said protective coating consisting essentially of a composite having a polymer base material and a conductive dope that is resistant to an acid-based electrolyte,
- at least one non-polarizable electrode assembly, said non-polarizable electrode assembly further comprising:
  - (a) at least one non-polarizable electrode consisting essentially of a composite mixture of a metal dioxide and a metal sulfate; and
  - (b) a current collector, said current collector further comprising: a substrate formed from an electrically conductive material, and a protective coating encasing at least a portion of said substrate that will be exposed to an electrolyte once said current collector is installed to said electrochemical capacitor, said protective coating consisting essentially of a composite having a polymer base material and a conductive dope that is resistant to an acid-based electrolyte,
- an enclosure for housing both said at least one polarizable electrode assembly and said at least one non-polarizable electrode assembly;
- at least one separator within said enclosure for separating said at least one polarizable electrode assembly from said at least one non-polarizable electrode assembly; and
- an acid-based electrolyte residing within said enclosure and between said at least one polarizable electrode assembly and said at least one non-polarizable electrode assembly;
- wherein charge storage is accomplished at said at least one polarizable electrode assembly by means of a non-Faradaic, double layer electrochemical mechanism that occurs at an interface of said polarizable electrode and said electrolyte; and
- wherein said charge storage is accomplished at said at least one non-polarizable electrode assembly by means of oxidation/reduction reactions that occur at an interface between said non-polarizable electrode and said electrolyte.

17. The double layer electrochemical capacitor of claim 16, wherein said conductive substrate of said current collector comprises lead or a lead compound.

18. The double layer electrochemical capacitor of claim 17, wherein said conductive substrate of said current collector comprises a mixture of lead and tin.

19. The double layer electrochemical capacitor of claim 16, wherein said at least one non-polarizable electrode consists essentially of a mixture of lead dioxide and lead sulfate.

20. The double layer electrochemical capacitor of claim 16, wherein said enclosure is sealed.

21. The double layer electrochemical capacitor of claim 16, wherein said separator envelops at least a portion of each of said non-polarizable electrode assemblies.

22. The double layer electrochemical capacitor of claim 16, wherein said separator is a glass material.

23. The double layer electrochemical capacitor of claim 22, wherein said glass material is ion-permeable.

24. The double layer electrochemical capacitor of claim 16, wherein said polarizable and said non-polarizable electrodes are asymmetric with respect to absolute capacitiance.

25. The double layer electrochemical capacitor of claim 24, wherein the larger capacitance electrode has an absolute capacitance that is at least three times and, more preferably, approximately ten times the absolute capacitance of the smaller capacitance electrode.

26. The double layer electrochemical capacitor of claim 16, wherein said acid-based electrolyte is sulfuric acid.

27. The double layer electrochemical capacitor of claim 16, wherein said polarizable and said non-polarizable electrodes are arranged in a substantially uniformly spaced and alternating relationship.

28. A double electric layer electrochemical capacitor, comprising:
- a plurality of polarizable electrode assemblies, each of said polarizable electrode assemblies comprising:
  - (a) at least one electrode consisting essentially of a composite mixture having an active material comprising an activated carbon obtained from the carbonization and subsequent activation of a furane tar and/or a furane resin, and a fluorine-containing polymer binder; and
  - (b) a current collector, said current collector further comprising: a substrate formed from an electrically conductive material, and a protective coating encasing at least a portion of said substrate that will be exposed to an electrolyte once said current collector is installed to said electrochemical capacitor, said protective coating consisting essentially of a composite having a polymer base material and a conductive dope that is resistant to an acid-based electrolyte,
- an enclosure for housing both said plurality of polarizable electrode assemblies;
- at least one separator within said enclosure for separating said plurality of polarizable electrode assemblies; and
- an acid-based electrolyte residing within said enclosure and between said plurality of polarizable electrode assemblies;
- wherein charge storage is accomplished at each of said plurality of polarizable electrode assemblies by means of a non-Faradaic, double layer electrochemical mechanism that occurs at an interface of said polarizable electrode and said electrolyte.

* * * * *